March 4, 1958
H. T. WHITE
2,825,286
MOTOR DRIVEN PUMPS
Filed May 27, 1957
2 Sheets-Sheet 1
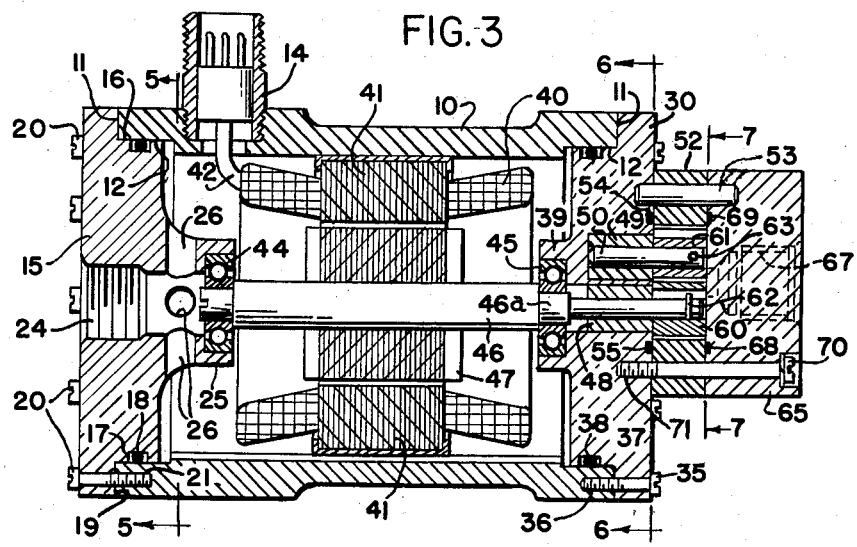
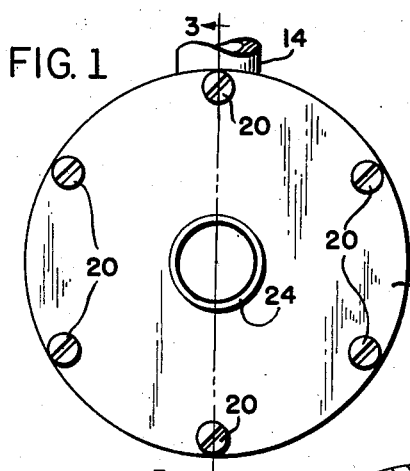
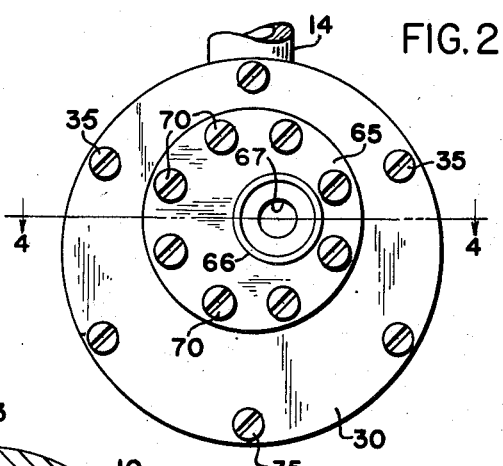
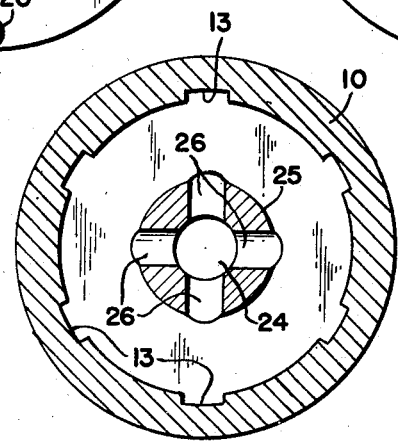
INVENTOR.
HOWARD T. WHITE
BY
ATTORNEY March 4, 1958

H. T. WHITE 2,825,286

MOTOR DRIVEN PUMPS

Filed May 27, 1957

*INVENTOR.*
HOWARD T. WHITE
BY

ATTORNEY

United States Patent Office 2,825,286
Patented Mar. 4, 1958

2,825,286

MOTOR DRIVEN PUMPS

Howard T. White, Melrose Park, Pa.

Application May 27, 1957, Serial No. 661,662

6 Claims. (Cl. 103—118)

This invention relates to motor driven pumps and more particularly to pumps of compact character with the inlet and outlet connections at opposite ends.

It is the principal object of the present invention to provide a motor driven pump in which the fluid being pumped flows through the motor rotor chamber and in contact with the motor windings, and which is of compact character.

It is a further object of the present invention to provide a motor driven pump in which the components are of relatively simple construction so that it can be easily assembled and which is held in assembled relation in a simple but effective manner.

It is a further object of the present invention to provide a motor driven pump in which a positive displacement pump is provided and is driven in an improved manner.

Other objects and advantageous features of the invention will be apparent from the description and claims.

The nature and characteristic features of the invention will be more readily understood from the following description, taken in connection with the accompanying drawings forming part thereof, in which:

Figure 1 is an end elevational view of a motor driven pump in accordance with the invention as seen from the inlet end;

Fig. 2 is an end elevational view of the motor driven pump in accordance with the invention as seen from the delivery end;

Fig. 3 is a longitudinal sectional view taken approximately on the line 3—3 of Fig. 1;

Fig. 5 is a transverse sectional view taken approximately on the line 5—5 of Fig. 3;

Figure 4:
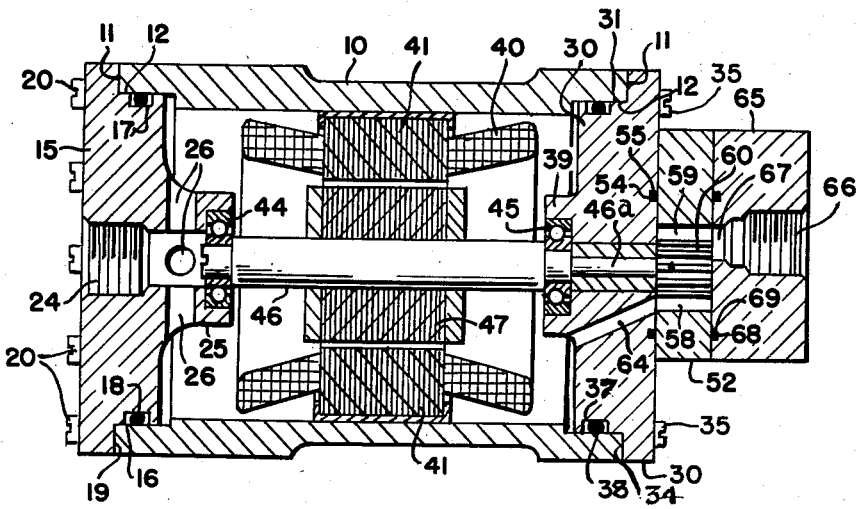
Fig. 4 is a longitudinal sectional view taken approximately on the line 4—4 of Fig. 2.
Figure 6:
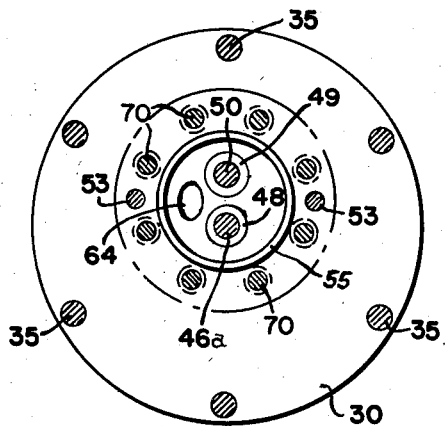
Fig. 6 is a transverse sectional view taken approximately on the line 6—6 of Fig. 3.
Figure 7:
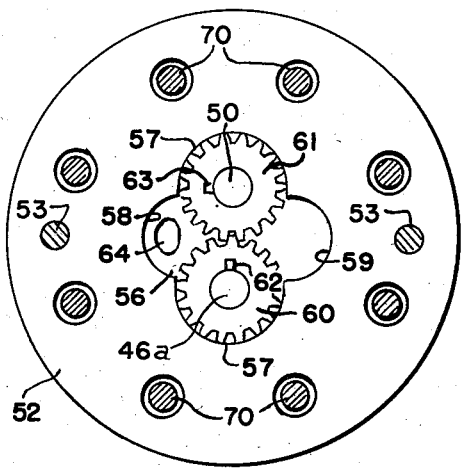
Fig. 7 is a transverse sectional view, enlarged, taken approximately on the line 7—7 of Fig. 3.

It should, of course, be understood that the description and drawings herein are illustrative merely, and that various modifications and changes can be made in the structure disclosed without departing from the spirit of the invention.

Like numerals refer to like parts throughout the several views.

Referring now more particularly to the drawings, the motor driven pump in accordance with the present invention preferably includes an outer hollow cylindrical motor housing 10 provided with transverse or diametrical end faces 11 and with cylindrical interior faces 12 at each end thereof. Within the interior of the housing 10 a plurality of longitudinally extending grooves 13 are provided. The housing 10 is provided with an electrical supply connection 14 in communication with the interior thereof for connection to any suitable source of alternating current. The supply connection 14 is of the leakproof type for preventing access of fluid from the interior of the housing 10 to the exterior.

The housing 10 is closed at one end by an end closure plate 15 which has an outer cylindrical surface 16 for engagement with one of the faces 12 and is provided with a groove 17 in which a packing 18, of any desired type, such as an O-ring, is provided for preventing fluid leakage at this location. The end closure plate 15 also has an annular surface 19 for engagement with one of the end faces 11 of the housing 10 for aiding in positioning the end closure plate 15 with respect to the housing 10. A plurality of bolts 20 are provided, extending through the end closure plate 15 into threaded engagement in blind holes 21 in the housing 10.

The end closure plate 15 is provided with a central fluid inlet connection 24 for the fluid to be pumped.

The end closure plate 15 is provided with an axially inwardly extending boss 25 having a plurality of radially outwardly extending passageways 26 in communication with the fluid inlet connection 24 for the delivery of fluid to be pumped to the interior of the housing 10.

At the opposite end of the housing 10 an end closure plate 30 is provided having an outer cylindrical surface 31 for engagement with the other of the faces 12 of the housing 10 and is provided with a groove 37 in which a packing 38, of any desired type such as an O-ring, is provided for preventing fluid leakage at this location. The end closure plate also has an annular surface 34 for engagement with the other end face 11 of the housing 10 for aiding in positioning the end closure plate 30 with respect to the housing 10. A plurality of bolts 35 are provided, extending through the end closure plate 30 and into threaded engagement in blind holes 36 in the housing 10.

The end closure plate 30 is provided with an inwardly axially extending boss 39.

Motor stator windings 40 and field pieces 41 are provided, preferably held in position in the grooves 13 in the housing 10 and have a current supply connection 42 connected thereto and to the connection 14.

The boss 25 of the closure plate 15 is preferably provided with a bearing 44 and the boss 39 of the end closure plate 30 is preferably provided with a bearing 45 in which a shaft 46 is journaled. The shaft 46 has mounted thereon a motor rotor 47, the rotor 47 preferably being of the short circuited type and disposed within the field pieces 41 of the motor stator.

The end closure plate 30 is preferably also provided with a bearing 48 through which a portion 46a of the shaft 46 of reduced diameter extends. The end closure plate 30 also has a bearing 49 mounted therein, in spaced relation to the bearing 48, for the reception of a shaft 50, parallel to the shaft portion 46a.

A pump housing plate 52 is provided and is held in indexed relation to the end closure plate 30 by pins 53 which extend therethrough and into openings in the end closure plate 30. The outer end face of the end closure plate 30 has an annular groove 54, within which a suitable packing 55, such as an O-ring, is provided for preventing fluid leakage at this location.

The pump housing plate 52 is provided with an interior pump chamber 56 therethrough having a pair of semi-circular sections 57 and side branches 58 and 59. Within the chamber 56 a pair of interengaging pumping units, preferably gears 60 and 61, are provided, the gear 60 being keyed to the shaft portion 46a by a pin 62 and the gear 61 being keyed to the shaft 50 by a pin 63. The gears 60 and 61 are in mesh and have a relatively close clearance with respect to the pump chamber sections 57 for pumping fluid therealong in the spaces between their teeth. The end closure plate 30 is provided with a diagonal passageway 64 which extends from the interior of the housing 10 to the side branch 58 of the pump chamber 56.

A pump housing end closure plate 65 is also provided, and can be held in indexed relation to the pump housing plate 52 by the pins 53 extending thereinto. The end closure 65 is provided with a fluid delivery connection 66 which is connected by a passageway 67 to the branch 59 of the pump chamber 56.

The end closure plate 65, on the inner face thereof, is provided with an annular groove 68, within which any suitable packing 69, such as an O-ring, is provided for preventing fluid leakage at this location.

The pump housing end closure plate 65 and the pump housing plate 52 are held in assembled relation to the end closure plate 52 by a plurality of studs 70 which extend through the end plate 65, the pump housing plate 52 and into blind threaded holes 71 in the end closure plate 32.

The mode of operation will now be pointed out.

Electrical energy supplied through the supply connection 14 and the connection 42 energizes the motor windings 40 for effecting rotation of the rotor 47. Rotation of the shaft 46 by the rotor 47 is effective for rotating the shaft portion 46a, and the gear 60 keyed thereto by the pin 62. The gear 60, in turn, rotates the gear 61 with which it is in mesh.

Fluid supplied to the inlet connection 24 passes through the passageways 26 to the interior of the housing 10 in contact with the motor rotor 47 and the stator windings 40 and field pieces 41 for cooling the same and also lubricating the bearings 44 and 45.

Fluid from the interior of the housing 10 passes through the passageway 64 to the branch 58 of the pump chamber 56 and is impelled by rotation of the gears 60 and 61 for delivery to the branch 59 of the pump chamber 56 and therefrom through the passageway 67 to the fluid delivery connection 66.

It will be noted that the manner of mounting the end closure plates 15 and 30 by the bolts 20 and 35 permits easy assembly thereof with respect to the housing 10 and in sealed relation thereto.

The pump housing plate 52 and pump housing end closure plate 65 can also be readily assembled with respect to the other end closure plate 30, after the shaft 50 and gears 60 and 61 have been placed in position, indexed and retained in the indexed position by the pins 53, and held in assembled relation by the bolts 70.

At the same time a very compact construction is provided.

I claim:

1. A motor driven pump comprising a hollow cylindrical motor housing, motor stator windings mounted in the interior of said housing, spaced end closure plates closing the ends of said housing, one of said end closure plates having a fluid connection therein in communication with the interior of said housing, a pump housing plate in facing relation to and closed on its inner side by the exterior of said other end closure plate, said pump housing plate having a pump chamber therein with spaced branches, said other end closure plate having a fluid passageway connecting the interior of said housing with one of said branches, a shaft journalled in said end closure plates and having an extension extending into said pump chamber, a motor rotor on said shaft within said windings, a second shaft journalled in said other end closure plate in spaced parallel relation to said shaft extension and extending into said pump chamber, interengaging fluid pumping members in said pump chamber carried respectively on said second shaft and said shaft extension and interposed between said branches, and a pump housing closure plate closing the outer side of said pump housing chamber, said pump housing closure plate having a fluid connection, and a passageway extending between said fluid connection and the other of said branches.

2. A motor driven pump as defined in claim 1 in which holding members are provided parallel to said shaft and extending from said pump housing closure plate through said pump housing plate and into said other end closure plate for retaining said plates in assembled relation.

3. A motor driven pump as defined in claim 1 in which indexing members are provided for positioning said pump housing plate with respect to said other end closure plate and said pump housing closure plate with respect to said pump housing plate.

4. A motor driven pump comprising a hollow cylindrical motor housing, motor stator windings mounted in the interior of said housing, spaced end closure plates in telescoped relation to and closing the ends of said housing, one of said end plates having a fluid inlet connection therein in communication with the interior of said housing, a pump housing plate in facing relation to and closed on its inner side by the exterior of said other end closure plate, said pump housing plate having a pump chamber therein with a supply branch and a delivery branch, said other end closure plate having a fluid passageway connecting the interior of said housing with said supply branch, a shaft journalled in said end closure plates and having an extension extending into said pump chamber, a motor rotor on said shaft within said windings, a second shaft journalled in said other end closure plate in spaced parallel relation to said shaft extension and extending into said pump chamber, interengaging fluid pumping members in said pump chamber carried respectively on said second shaft and said shaft extension and interposed between said branches, and a pump housing closure plate closing the outer side of said pump housing chamber, said pump housing closure plate having a fluid delivery connection and a passageway extending between said fluid delivery connection and said delivery branch.

5. A motor driven pump comprising a hollow cylindrical motor housing, motor stator windings mounted in the interior of said housing, spaced end closure plates in telescoped relation to and closing the ends of said housing in fluid tight relation thereto, one of said end plates having a fluid inlet connection therein in communication with the interior of said housing, a pump housing plate in facing relation to and closed on its inner side by the exterior of said other end closure plate, an annular sealing member carried by said end closure plate in engagement with said pump housing plate, said pump housing plate having a pump chamber therein with a supply branch and a delivery branch, said other end closure plate having a fluid passageway connecting the interior of said housing with said supply branch, a shaft journalled in said end closure plates and having an extension extending into said pump chamber, a motor rotor on said shaft within said windings, a second shaft journalled in said other end closure plate in spaced parallel relation to said shaft extension and extending into said pump chamber, interengaging fluid pumping members in said pump chamber carried respectively on said second shaft and said shaft extension and interposed between said branches, a pump housing closure plate closing the outer side of said pump housing chamber, and an annular sealing member carried by said pump housing closure plate in engagement with said pump housing plate, said pump housing closure plate having a fluid delivery connection and a passageway extending to said fluid delivery connection from said delivery branch.

6. A motor driven pump as defined in claim 1 in which holding members are provided parallel to said shaft and extending from said pump housing closure plate through said pump housing plate and into said other end closure plate for compressing said sealing members and retaining said plates in assembled relation.

No references cited.